UNITED STATES PATENT OFFICE.

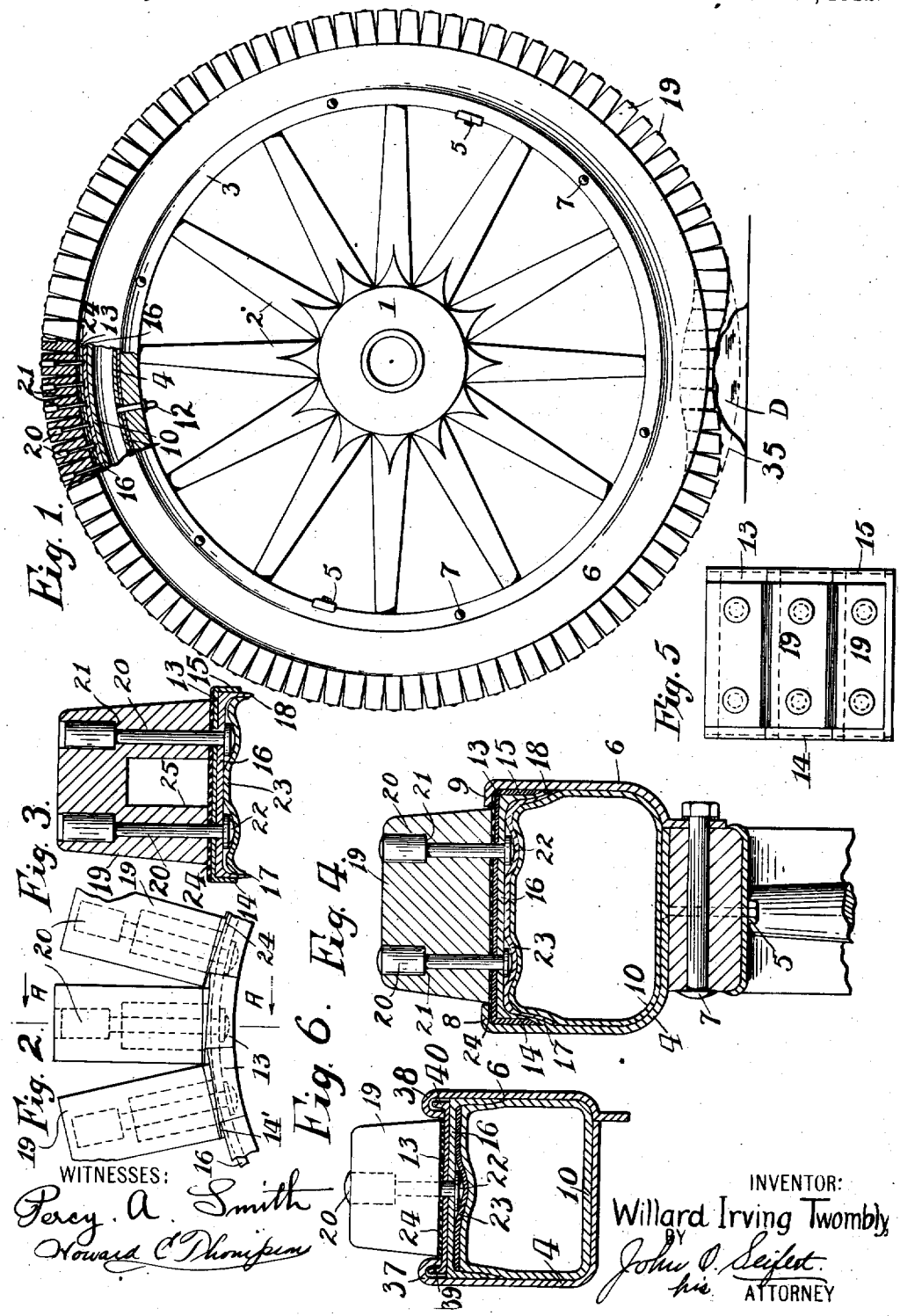

WILLARD IRVING TWOMBLY, OF NEW YORK, N. Y., ASSIGNOR, BY MESNE ASSIGNMENTS, TO TWOMBLY MOTORS COMPANY, OF NEW YORK, N. Y., A CORPORATION OF NEW YORK.

TIRE.

1,018,454.   Specification of Letters Patent.   Patented Feb. 27, 1912.

Application filed April 2, 1910. Serial No. 553,104.

*To all whom it may concern:*

Be it known that I, WILLARD IRVING TWOMBLY, a citizen of the United States, residing in the borough of Manhattan, in the city, county, and State of New York, have invented a new and useful Improvement in Tires, of which the following is a specification.

This invention relates to pneumatic tires for vehicle wheels, and it is the object of the invention to provide a simple, compact, durable and efficient tire of this character, which is cheap in construction and readily applied to a vehicle wheel.

It is a further object of the invention to provide a tire of this character which is non-puncturable and having a minimum liability to blowouts.

In carrying out the invention I provide a rim constructed to form an annular casing of channel section, which casing is secured to the felly of a wheel. Within said casing I place an inflatable air tube, a flexible metal armor also engaging in the casing to have radial movement therein, and a sheathing being interposed between the armor and air tube. A suitable tread is secured to and carried by the armor. The said annular casing and armor constitute an entirely closed and puncture-proof casing for the air tube.

In the drawing accompanying and forming a part of this specification Figure 1 is a side elevation of a vehicle wheel, with my improved tire applied thereto, the said wheel being shown as encountering and riding over an obstruction. Fig. 2 is a detail to illustrate the manner of the overlapping of the armor and the securing of the tread and armor sections to the flexible band. Fig. 3 is a sectional detail view of the parts shown in Fig. 2, the section being taken on the line A—A and looking in the direction of the arrow. Fig. 4 is an enlarged cross-sectional view of my improved tire applied to a wheel felly. Fig. 5 is a fragmentary detail plan elevation of a section of the tread and flexible armor; and Fig. 6 is a cross sectional view illustrating a modification.

Similar characters of reference designate like parts throughout the different views of the drawings.

In the form of my invention as illustrated in Fig. 1 I have shown the same as applied to a vehicle wheel comprising the usual hub 1, the radiating spokes 2 and a felly 3. Secured to said wheel felly is a rim of any suitable non-puncturable material, such as metal, comprising an annular section 4, angle shaped in cross section, fixed to the periphery of the felly by means of bolts 5, and an annular section or plate 6 secured to the side of the felly by bolts 7, said sections 4 and 6 having laterally extending flanges 8 and 9, and so constructed as to form an annular casing substantially channel or U-shaped in cross section. In said casing I place the usual inflatable air tube 10 provided with a valve 12 extending through the felly 3, to which may be connected an air pump to inflate said tube. Within said casing or housing is carried a flexible armor for the air tube, which may consist, as illustrated in Figs. 2 and 5, of a series of overlapping or interlocking metal strips or plates 13, preferably of clock spring steel, bent at right angles to form flanges 14, 15 at their lateral edges so as to permit of a free radial sliding movement in the casing, said plates being cut away as at 14', to permit of the overlapping of the plates, and a flexible channel shaped band 16 of any suitable material, such as leather or the like, to which the metal strips 13 are secured, the edges 17, 18 of the ring 16 extending around the air tube 10 between said air tube and the inner walls of the sections 4, 6 of the casing to protect said air tube from being ruptured by coming in contact with the flanges 14, 15 of the flexible armor sections 13, and also to prevent creeping of said tube. Outside of said armor I provide a suitable tread, illustrated in Figs. 1 to 5 as consisting of a sectional tread comprising a series of blocks 19 of any suitable material, such as rubber, fiber, wood or the like, one block for each section of the flexible armor, the said tread sections 19 being of less length than said armor sections to permit of the overlapping or interlocking of said armor sections, and also of less width to permit of the free radial movement of the blocks between the rim flanges (Fig. 5). The armor sections and tread blocks are secured to the band or ring 16 in any suitable manner, and shown in the present instance as comprising studs 20 passing through the band or ring 16, armor sections 13 and blocks 19. The said studs are provided with shoulders 21 to engage with shoulders in the holes through which they pass in the tread sections 19 and riveted at the ends 22. The studs may project beyond the tread sections to act as non-skidding devices. To prevent any undue chattering or clattering of the flexible armor-sections as the wheel rotates and they come in contact with the flanges 8, 9 of the casing section, I provide a suitable noise deadener, of some suitable flexible material, in the present instance shown as comprising a piece of fabric 24, which may be vulcanized to the tread section 19, or applied in strip form to the outer surface of the armor sections between said sections and the flanges 8 and 9 of the annular casing.

In Figs. 2 and 3 I have shown the studs as extending to a distance slightly below the outer surface of the tread leaving a recess or cup in the tread sections which materially increase the resiliency of the tread. In these views the blocks are also shown as provided with a recess 25, thus decreasing the cost of the tread, and also tending to increase the resiliency of the same.

In Fig. 1 I have illustrated, somewhat diagrammatically, the action of the wheel and flexible protecting armor and tread when the wheel encounters and rides over an obstruction D. In said Fig. 1 as the wheel encounters the obstruction approximately one-third of the shock is imparted to the vehicle wheel and body, raising said wheel substantially one-third of the height of the obstruction, as illustrated by the dotted line 35, the greater portion of the shock, however, being taken up by the tire. When it rides upon the obstruction a rolling or rocking action is imparted to the blocks, which is permissible owing to the overlapping or interlocking construction of the protecting armor 15, the flanges on the lateral edges of the armor sections sliding radially within the inner walls of the annular casing sections 4 and 6. This action of the tread and armor causes a partial compression of the air in the air tube 10, and as soon as the wheel has ridden over the obstruction the air in said tube causes the parts to resume their normal positions.

From the foregoing description, and as illustrated in the drawings, it will be obvious that I produce a pneumatic tire that will readily respond to any shock without undue shock to the vehicle body, and which is in every way as efficient as a pneumatic tire the shoe of which is constructed of rubber, or a combination of rubber with a fabric reinforcement, with the additional advantage, owing to the annular casing and the armor being constructed of metal or the like, of providing an entirely closed and puncture-proof casing with a minimum liability of blowouts.

The tire is quickly detachable for the purpose of readily getting access to the air tube, or to remove the tire and protecting armor, and in case a sectional tread is employed to remove a tread section and substitute another, by releasing the bolts 7 and removing the annular case section 6. It will be obvious that they may be as readily re-assembled.

Interposed between the armor 16 and the air tube 10 is a sheathing 23 of any suitable material, such as fabric, felt or the like, to protect the air tube against rupture by the said armor or the heads 22 of the studs. If desired said protecting sheathing may be directly connected to the air tube 10 as by cementing or otherwise.

In Fig. 6 I have illustrated the walls 4, 6 of the annular casing as being provided with inwardly-turned or hooked flanges 37, 38, and the metal strips 13 provided at their lateral edges with outwardly-extending flanges 39, 40 to engage in the recesses or channels formed by the inwardly-turned or hooked flanges on the casing walls. By this construction the sections 13 may be made of very thin material without any liability of the air pressure in the air tube 10 causing the same to be displaced from within the annular casing, the inwardly-turned or hooked flanges in such case having a firm locking engagement with the said flanges 37, 38.

Variations may be resorted to within the scope of the invention, and portions of the improvements may be used without others.

Having thus described my invention, I claim:

1. In a vehicle wheel, the combination with the wheel felly, of an annular casing of channel section fixed to said felly, each wall of which casing has a laterally extending flange; an inflatable air tube carried within said casing; a flexible armor, comprising a series of circumferentially disposed and overlapping metal plates carried by the casing within the flanges, the lateral edges of said plates being bent at right angles to form flanges to have sliding engagement with the inner walls of the casing; circumferentially-disposed blocks, one block for each of the metal plates; and shouldered studs passing through the blocks and plates to secure them together; said armor and tread adapted to have radial movement into the casing.

2. The combination in a pneumatic tire, of an annular U-shaped metal casing each wall of which has a laterally-extending flange; an inflatable air tube carried within said casing; a flexible metal band, comprising a series of overlapping metal plates having flanges at their lateral edges and carried by said annular casing to have radial movement therein within the flanges; blocks of less length than the plates; a retaining ring to which the plates and blocks are secured; and a sheathing interposed between the air tube and retaining ring.

3. In a vehicle wheel, the combination with the wheel felly, of a rim comprising a pair of annular sections fixed to the felly to form a casing channel-shaped in cross section; an air tube in said casing; a flexible leather band extending around the said air tube, said band being of such width as to partly lap around the air tube; a flexible armor, comprising a series of overlapping metal plates; a tread; and studs to secure the plates and tread to the leather band; said armor with the tread adapted to have radial movement in the rim.

4. In a vehicle wheel, the combination with the wheel felly, of an annular section angular in cross section secured to the periphery of the felly, and an annular section secured to one side of the felly, said sections forming an annular casing channel shaped in cross section, each section of which has a laterally projecting flange; an air tube in said casing; a flexible armor comprising a series of circumferentially disposed and overlapping metal plates carried within the rim to have radial movement therein, the lateral edges of said plates being bent to form flanges to have sliding engagement with the inner walls of the casing, with portions of the flanges cut away to permit of the overlapping of the plates; a tread comprising circumferentially disposed rectangular blocks, one block for each plate but of less width and length than said plates; a flexible retaining band interposed between the armor and the air tube, said band being of such width as to partly lap around the air tube; and studs to secure the metal plates and blocks to the retaining band.

5. In a vehicle wheel, the combination with the wheel felly, of a rim comprising a pair of annular sheet metal sections fixed to the felly to form an annular casing of channel section; an inflatable air tube in said casing; a flexible leather band extending partly around the air tube; a flexible armor comprising a series of overlapping metal plates having flanges at their lateral edges with portions of said flanges cut away to permit of the overlapping of said plates; a sectional tread comprising circumferentially disposed blocks; and studs to secure the plates and tread sections to the leather band.

WILLARD IRVING TWOMBLY.

Witnesses:
JOHN O. SEIFERT,
PAULA PHILIPPS.

---

Copies of this patent may be obtained for five cents each, by addressing the "Commissioner of Patents, Washington, D. C."